Sept. 24, 1963
T. W. KNACKE ETAL
3,104,612
AIRBORNE TARGET VEHICLE
Filed June 12, 1961
4 Sheets-Sheet 1
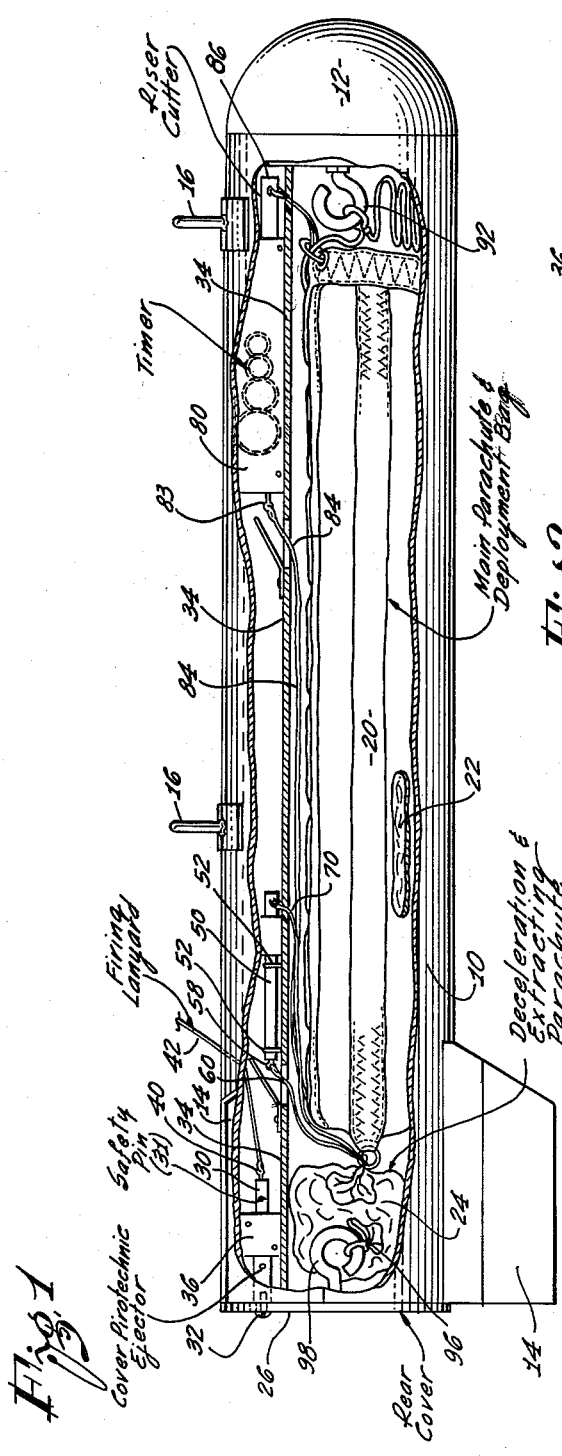
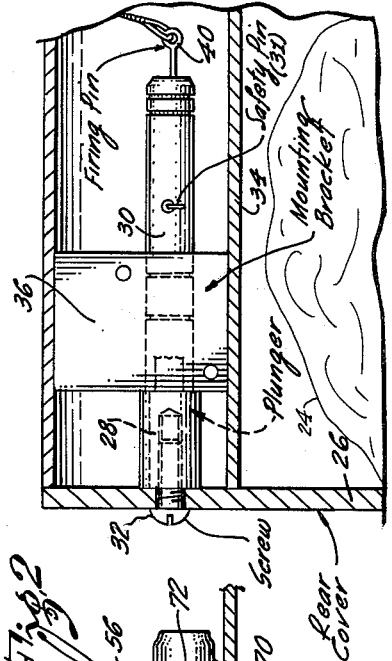
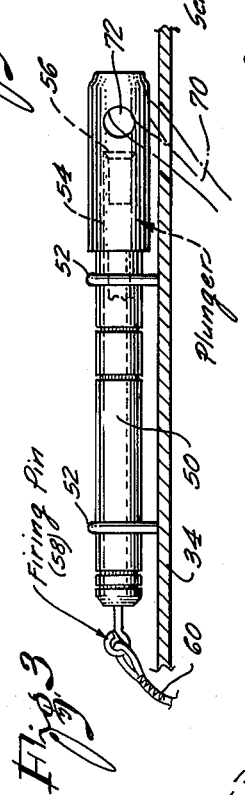
INVENTORS:
Theodore W. Knacke
Philip H. Young
By Keith D. Beecher
Attorney

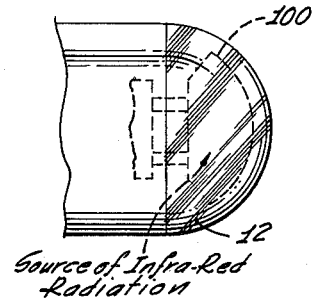
Fig. 4
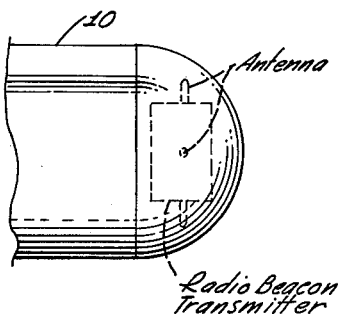
Fig. 5
Fig. 6 (Aircraft Drop)
Fig. 7 (Deployment of Deceleration Parachute)
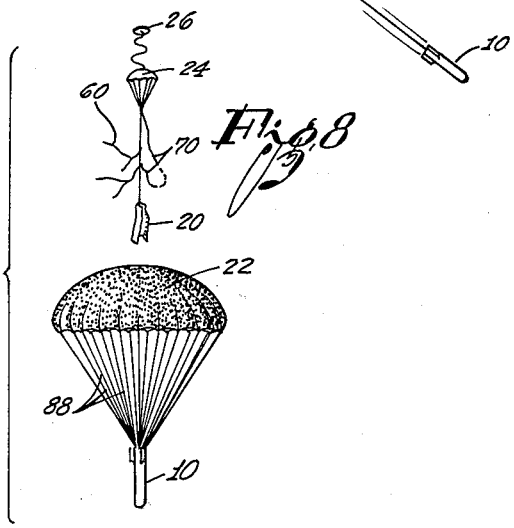
Fig. 8
Fig. 9

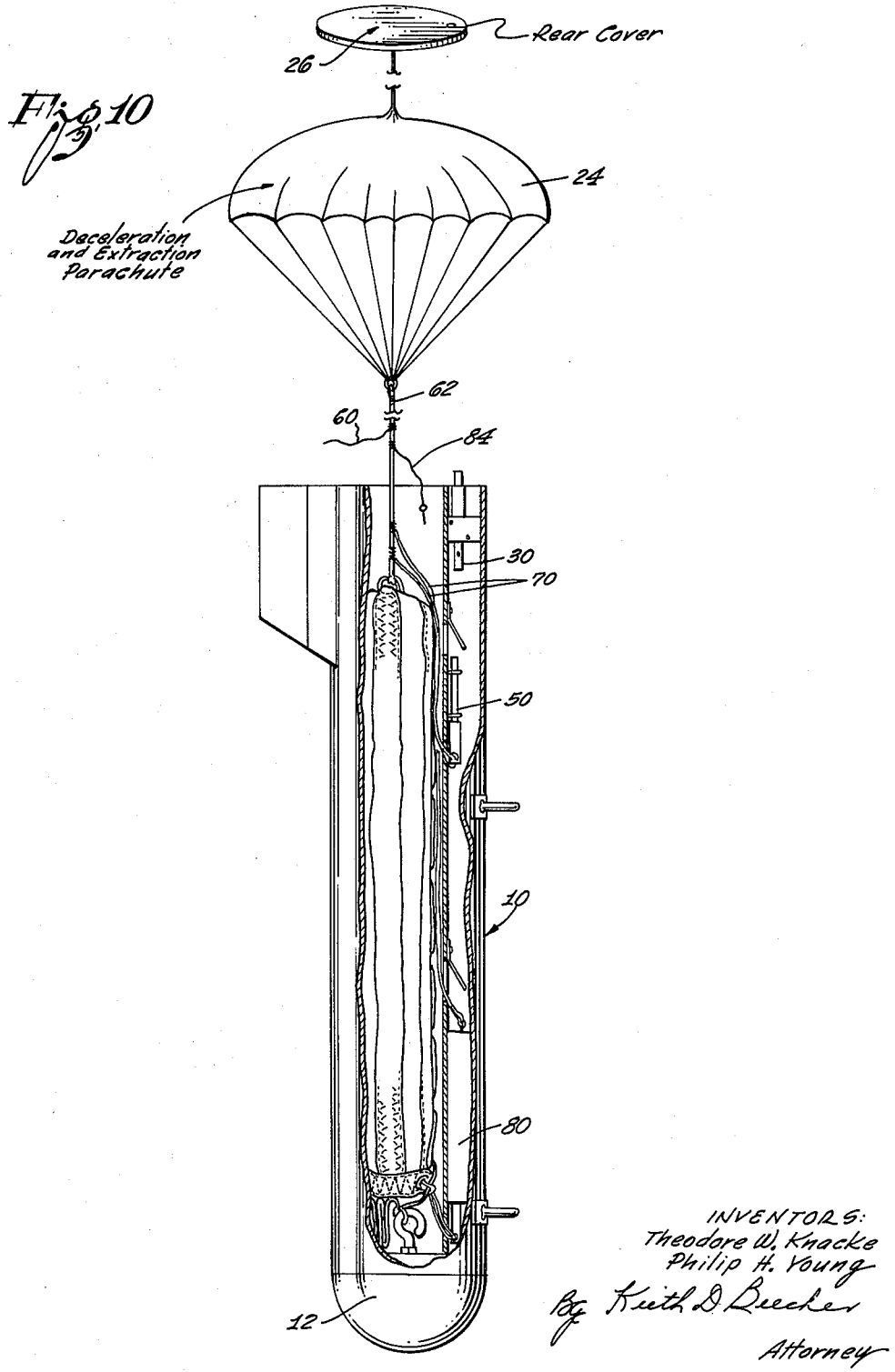

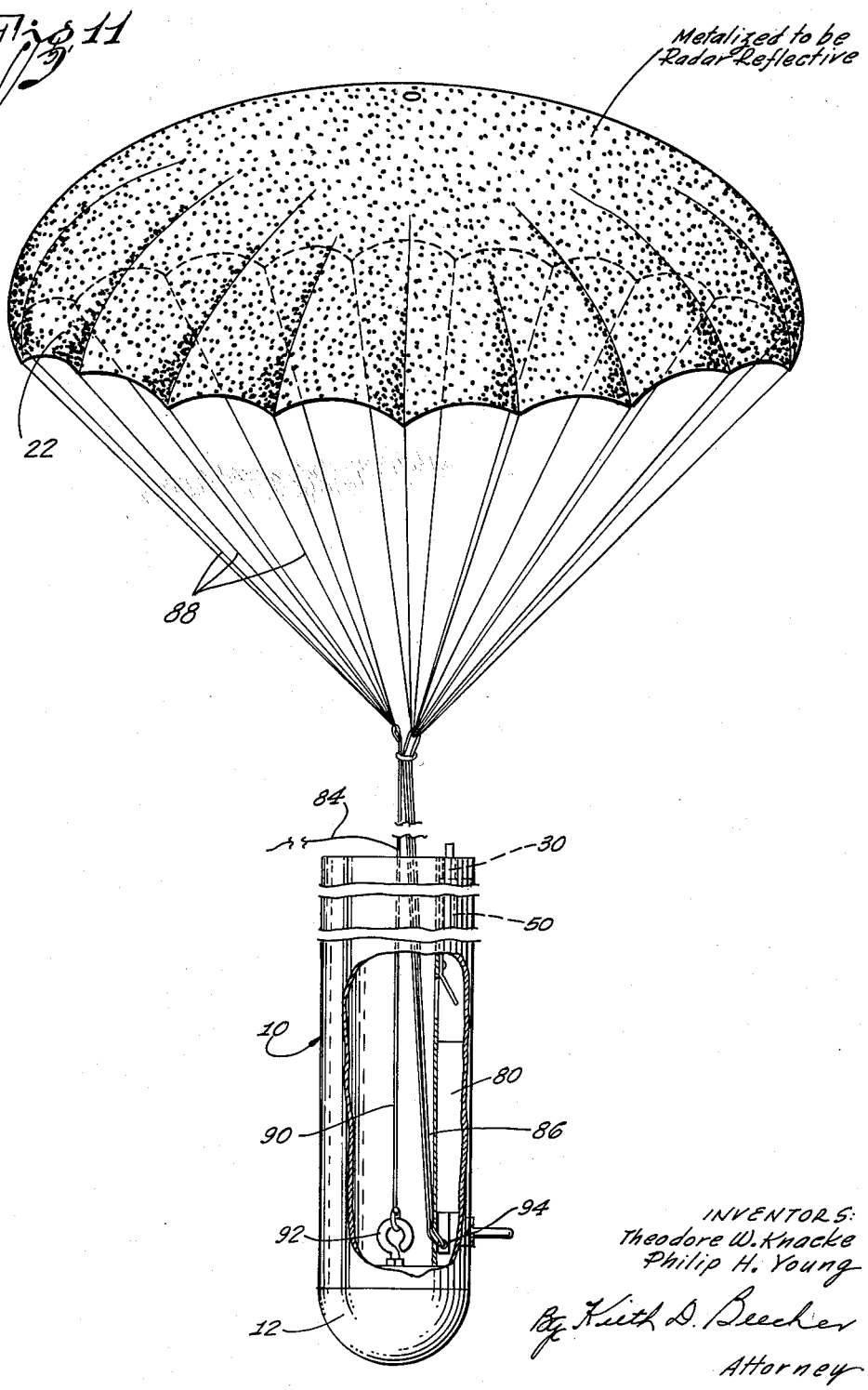

3,104,612
AIRBORNE TARGET VEHICLE
Theodore W. Knacke, Los Angeles, and Philip H. Young, Redondo Beach, Calif., assignors, by mesne assignments, to Itek Corporation, Lexington, Mass., a corporation of Delaware
Filed June 12, 1961, Ser. No. 116,545
6 Claims. (Cl. 102—37.6)

The present invention relates to airborne target vehicles, and it relates more particularly to a vehicle for a parachute-type of target which is adaptable to be launched from a carrier aircraft, ship, or any other type of surface or airborne craft.

The type of target with which the present invention is concerned in one of its aspects is a radar-reflective type of parachute which is most useful in pilot training and in testing radar-type fire control systems in aircraft, and in testing missiles using radar target-acquisition systems.

The parachute target referred to above is usually launched from the carrier aircraft in a bomb-like vehicle, the parachute being composed of radar-reflective material and being deployed from the vehicle to provide a radar-sensitive target. The vehicle itself is usually retained in a suspended position on the parachute to furnish the required weight to maintain the parachute in an inflated condition.

In another aspect of the invention, the nose cone of the vehicle is used as a source of infra-red radiation, so that the target may be used in conjunction with infra-red equipment. This latter aspect may be used in conjunction with the radar reflective parachute, or the parachute may be used merely as a means for maintaining the infra-red source in an airborne condition. In the same manner, a beacon radio transmitter may be supported in the nose cone of the vehicle.

In either aspect, the present invention provides a vehicle which may be appropriately launched from a carrier aircraft, and which incorporates a completely automatic system for subsequently deploying the main parachute from the vehicle.

In the embodiment of the invention to be described, pyrotechnic means are employed to eject the rear cover of the vehicle, the pyrotechnic means being timed so that the ejection occurs a predetermined time interval after the vehicle has been launched from the carrier aircraft. The ejection of the rear cover in the embodiment to be described, in turn, causes a deceleration and extraction parachute to be deployed from the vehicle. The deceleration and extraction parachute has two functions. Firstly, it serves to slow down the launched vehicle; and secondly, it serves to deploy the main parachute.

It is an object of the invention to provide such an improved vehicle and associated control system which is fully automatic in its operation, and which is controlled so that the deceleration and extraction parachute and the main parachute are deployed in an automatically controlled precisely and properly timed sequence.

Another object of the invention is to provide such an improved vehicle and associated control system which is fully automatic in its operation and which requires no special preparation prior to launching or to attachment in the carrier aircraft.

Another object of the invention is to provide an improved target parachute vehicle and associated automatic control system which is capable of being carried at extremely high speeds and at high altitudes without any deleterious effects.

A further object of the invention is to provide such an improved vehicle and associated control system which is light in weight, compact in size, and which utilizes a minimum of internal components.

Yet another object of the invention is to provide such an improved target parachute vehicle and associated control system which is constructed to be suitable for internal or external storage on the carrier aircraft.

Yet another object of the invention is to provide such an improved vehicle and control system which is constructed to deactivate the main target parachute after a predetermined interval so as to cause it to stream to earth, rather than to drift over wide areas after the completion of its mission.

The features of the invention which are believed to be new are set forth with particularity in the claims. The invention itself, however, together with further objects and advantages, may be best understood by reference to the following description when taken in conjunction with the accompanying drawings, in which:

FIGURE 1 is a side view, partly in section, illustrating a target parachute vehicle constructed in accordance with one embodiment of the invention;

FIGURE 2 is a fragmentary sectional view of a portion of the vehicle of FIGURE 1 and showing in more detail a pyrotechnic cover ejector assembly which is mounted in the vehicle;

FIGURE 3 is an enlarged view of a pyrotechnic cutter assembly which also is mounted in the vehicle for reasons to be described;

FIGURE 4 is a fragmentary schematic view of the nose of the vehicle having, in accordance with the second embodiment of the invention, a source of infra-red radiation supported therein;

FIGURE 5 is a fragmentary view showing schematically the nose of the vehicle and having, in accordance with a further embodiment of the invention, a radio beacon transmitter mounted therein;

FIGURES 6, 7, 8 and 9 are schematic diagrams illustrating the sequence of operations which occur automatically as the vehicle of FIGURE 1 is launched from the carrier aircraft;

FIGURE 10 is a sectional view of the vehicle of FIGURE 1, and illustrating the condition of the internal components when the vehicle is first launched from the aircraft and the deceleration parachute is deployed but not released; and FIGURE 11 is a sectional view of the vehicle showing the state of the internal components when the main target parachute is fully deployed.

The target parachute vehicle of the invention, as shown in the embodiment of FIGURE 1, includes a metallic container 10 which may have an essentially cylindrical configuration. A nose portion 12 is positioned at the forward end of the container 10, and a plurality of stabilizing fins 14 are positioned at the rear end of the container. Three fins, such as the fin 14, may be used for stabilizing purposes. It will be appreciated that the vehicle has a bomb-like configuration. A pair of eye-shaped mounting brackets 16 are positioned on the container 10, and these brackets permit the vehicle to be suspended from the usual bomb shackle of the carrier aircraft.

The container 10 of the vehicle houses a deployment bag 20 which, in turn, contains the main parachute 22, the main parachute being shown in its fully activated condition in FIGURE 11. The main parachute 22 may be metallized to provide a radar reflective surface for usual radar training and test purposes, as described above.

A deceleration and extraction parachute 24 is also positioned in the housing 10. The latter parachute serves two functions. When the vehicle is first launched, the deceleration and extraction parachute is subsequently deployed, and it is held in an unreleased condition so as to cause the vehicle to decelerate down to a relatively slow speed of descent. Subsequently, the deceleration and extraction parachute is released, in a manner to be described, and it then serves to extract the deployment bag 20 from the container 10 so as to deploy the main parachute.

The container 10 has a rear cover 26, and the rear cover is attached to the plunger 28 of a pyrotechnic ejector mechanism 30. The cover 26 is attached to the plunger 28 by means, for example, of a screw 32.

The pyrotechnic cover ejector 30 is best shown in FIGURE 2. The ejector is mounted on a shelf 34 in the container 10 by means of a suitable mounting bracket 36. The ejector is held with its forward end flush against the inner surface of the rear cover 26. The plunger 28 is caused to move rapidly to the left in FIGURE 2 when the ejector mechanism is fired, and this action of the plunger 28 causes the rear cover 26 to be ejected from the container 10 shearing the head of the screw 32.

The pyrotechnic ejector mechanism 30 may be of any appropriate type. It may, for example, be of the type presently manufactured by Ordnance Associate, Inc., 855 El Centro Street, South Pasadena, California. The pyrotechnic ejector uses, for example, a usual percussion primer, and the primer is armed when the firing pin 40 is withdrawn from the body of the ejector mechanism. A safety pin 31 prevents premature arming of the mechanism.

The pyrotechnic ejector mechanism 30 may be constructed to provide any desired time delay up to, for example, 16 seconds between the pulling of the firing pin and the actual actuation of the plunger 28. In a constructed embodiment of the invention, a four second time delay was provided.

A firing lanyard 42 is secured to the firing pin 40, and the firing lanyard is fastened to the carrier aircraft. The arrangement is such that the pin 40 is withdrawn as the vehicle is launched from the carrier aircraft. Then, after the selected four second time delay, the rear cover 26 is ejected by the mechanism 30 from the vehicle.

The container 10 of the target parachute also includes a pyrotechnic cutter mechanism 50 which is also mounted on the platform 34 within the container. The cutter mechanism 50 is mounted on the platform 34 by means of a pair of appropriate brackets 52. The cutter mechanism 50 may be similar to the ejector mechanism 30. However, the mechanism 50 actuates a plunger 54 (FIGURE 3) which has a cutter blade 56 at its forward end.

The firing pin 58 of the pyrotechnic cutter mechanism 50 has a lanyard 60 extending from it to the riser 62 (FIGURE 10) of the deceleration and extraction parachute 24. This lanyard 60 causes the pin 58 to be withdrawn from the mechanism 50 so as to arm the mechanism upon the deployment of the deceleration and extraction parachute.

The pyrotechnic cutter mechanism 50 is constructed to exhibit a time delay of, for example, 12 seconds between the extraction of the firing pin 58 and the actuation of the plunger 54 and cutter blade 56. The riser 62 (FIGURE 10) of the deceleration and extraction parachute 24 has a line 70 which is looped through an aperture 72 in the mechanism 50. So long as the plunger 54 is in the position shown in FIGURE 3, the mechanism 50 serves to hold the deceleration and extraction parachute 24 in an unreleased position, as shown in FIGURE 10. However, upon the actuation of the plunger 54 and its associated cutter blade 56, the line 70 is severed, and the deceleration and extraction parachute is released from the container.

The deceleration and extraction parachute 24 is secured to the rear end of the deployment bag 20. Upon the release of the parachute 24, it serves to extract the deployment bag 20 from the container, so as to cause the main parachute 22 to be deployed and to assume the position shown in FIGURE 11.

An appropriate clock mechanism 80 is also mounted on the platform 34 within the container 10. The clock mechanism includes a start pin 83 which, in turn, is secured to the riser 62 of the extraction parachute 24 (FIGURE 10) by means of a lanyard 84. When the parachute 24 is deployed, the pin 82 is withdrawn from the clock mechanism 80, and the clock mechanism is set in an operative condition. This clock mechanism may be of any appropriate form, and in a constructed embodiment of the invention it assumes a mechanical spring driven configuration.

The clock mechanism 80 functions as a timer, and after a particular time interval it activates a pyrotechnic cutter mechanism 86. The cutter mechanism 86 may have a similar plunger-cutter configuration as the cutter mechanism 50 of FIGURE 3. As shown in FIGURE 11, the suspension lines 88 of the main parachute 22 are coupled to three risers 90. One of these risers is directly connected to a hook 92 on the rear wall of the nose portion 12 of the container 10. The other two risers are looped through an aperture 94 of the cutter mechanism 86.

The clock mechanism 80, as noted above, serves to arm the pyrotechnic cutter mechanism 86 a predetermined time after the pin 82 has been withdrawn by the deployment of the deceleration and extraction parachute 24. The clock mechanism is set, for example, to an interval of the order of 25 minutes. Then, the actuation of the cutter mechanism 86 severs the pair of risers 90 of the main target parachute 22, so that the target parachute may be deactivated, to permit the vehicle assembly to stream to earth.

As shown in FIGURE 1, the apex of the deceleration and extraction parachute 24 is secured by a brake cord 96 to a hook 98 mounted on the inner surface of the cover 26. This enables the cover 26 to draw the deceleration and extraction parachute 24 out through the rear end of the container 10 as the cover is ejected.

As shown in FIGURE 4, a source 100 of infra-red radiation may be mounted in the nose portion 12 of the vehicle for the reasons described above, and in accordance with a second embodiment of the invention. In like manner, and as shown in FIGURE 5, a radio beacon transmitter may be mounted in the nose portion 12 for the reasons discussed above.

The operation of the vehicle is best shown in FIGURES 6–9. As shown in these figures, the vehicle is first dropped from the carrier aircraft, and it is allowed to fall freely for an interval, for example, of 4 seconds. The deceleration and extraction parachute is then deployed, as shown in FIGURE 7. This parachute serves to decelerate the vehicle. The deceleration parachute 24 is maintained in the unreleased condition shown in FIGURE 7 for an interval of, for example, an additional 12 seconds. Then, the parachute 24 is released, and it serves to draw the deployment bag out of the container 10 so as to deploy the main target parachute. The vehicle then assumes its operative condition of FIGURE 11, in which the main target parachute is fully inflated. After an interval of, for example, 25 minutes, the mission is assumed to be completed, and the mechanism 86 is activated to cut the pair of main parachute risers as described above. The vehicle assembly then assumes the condition shown in FIGURE 9, and it streams to earth.

A constructed embodiment of the invention has the following configuration and performance characteristics. The data concerning the constructed embodiment is listed herein merely as an illustrative example, and this data is not intended to limit the invention in any way.

The radar reflective surface of the constructed embodiment is a shaped gore parachute of metallized material, and its radar reflectivity is approximately equal to that of a 12 foot diameter sphere. The vehicle carrying the metallized parachute has a cylindrical shape with a hemispherical nose, and it can be mounted in the carrier aircraft by a standard 14 inch bomb shackle. As mentioned above, the vehicle is suitable for either internal or external storage on the carrier aircraft.

The physical characteristics of the constructed embodiment under consideration are as follows: the cylindrical container has a length of 30 inches, a diameter of 5.25 inches, and a weight of 18 pounds. Three stabilizing fins are positioned at the rear end of the container, and a nose portion is positioned at its forward end. The vehicle may be dropped from the carrier aircraft at altitudes up to 80,000 feet, and at speeds up to Mach 1.7. The time from launching to the full development of the radar reflective area is approximately 19 seconds.

The invention provides, therefore, an improved and fully automatic target parachute vehicle and control system which is relatively simple in its concept, compact in size and light in weight. As described above, the vehicle is eminently suited for its intended purpose, and the control system housed in the container of the vehicle functions at predetermined time intervals in an accurate and fully automatic manner to deploy the deceleration and extraction parachute and the main parachute in a desired timed sequence, and subsequently to deactivate the main parachute so that the assembly may stream to earth.

We claim:

1. A target vehicle assembly including: a container, a deceleration and extraction parachute positioned in said container and secured thereto, a main parachute positioned in said container, a cover mounted on said container, means for securing the apex of said deceleration and extraction parachute to said cover, pyrotechnic ejector means mounted in said container for ejecting said cover from said container a predetermined time interval after the arming of said ejector means so as to deploy said deceleration and extraction parachute from said container, first lanyard means coupled to said pyrotechnic ejector means for arming said pyrotechnic ejector means upon the launching of the target vehicle, pyrotechnic release means mounted in said container for releasing said deceleration and extraction parachute from said container a predetermined time interval after the arming of said pyrotechnic release means, second lanyard means coupled to said pyrotechnic release means and to said deceleration and extraction parachute to arm said release means upon the deployment of said deceleration and extraction parachute, and a deployment bag for said main parachute positioned in said container and fastened at its rear end to said deceleration and extraction parachute for deploying said main parachute from said container upon the release of said deceleration and extraction parachute from said container.

2. A target vehicle assembly including: a container, a deceleration and extraction parachute positioned in said container, riser means secured to said deceleration and extraction parachute, a main parachute positioned in said container, a cover mounted on said container, means for securing the apex of said deceleration and extraction parachute to said cover, pyrotechnic ejector means mounted in said container for ejecting said cover from said container a predetermined time interval after the arming of said ejector means to deploy said deceleration and extraction parachute from said container, first lanyard means coupled to said pyrotechnic ejector means for arming said pyrotechnic ejector means upon the launching of the target vehicle, pyrotechnic release means mounted in said container, a line secured to said riser means and to said pyrotechnic release means to be severed by said pyrotechnic release means a predetermined time after the arming thereof to release said deceleration and extraction parachute from said container, second lanyard means extending from said riser means to said release means to arm said release means upon the deployment of said deceleration and extraction parachute, and a deployment bag for said main parachute positioned in said container and fastened at its rear end to said riser means of said deceleration and extraction parachute for deploying said main parachute from said container upon the release of said deceleration and extraction parachute from said container.

3. The assembly defined in claim 1 and which includes means mounted in said container for deactivating said main parachute a predetermined interval after the deployment thereof.

4. The assembly defined in claim 2 and which includes a timer mechanism mounted in said container, third lanyard means coupled to said timer mechanism and to said riser means of said deceleration and extraction parachute for activating said timer mechanism upon the deployment of said deceleration and extraction parachute, and means mounted in said container and activated by said timer mechanism to deactivate said main parachute a predetermined time interval after the deployment thereof.

5. The assembly defined in claim 2 and which includes a plurality of risers coupling said main parachute to the forward end of said container, a timer mechanism mounted in said container, a third lanyard means coupled to said timer mechanism and to said riser means of said deceleration and extraction parachute for activating said timer mechanism upon the deployment of said deceleration and extraction parachute, and means mounted in said container and engaging selected ones of said plurality of risers and activated by said timer mechanism to sever said selected ones of said plurality of risers so as to deactivate said main parachute a predetermined interval after the deployment thereof.

6. A target vehicle assembly including: a container having an essentially cylindrical configuration and including a nose portion, a deceleration and extraction parachute positioned in said container, riser means secured to said deceleration and extraction parachute, a main parachute positioned in said container, a cover mounted on the rear end of said container, a brake cord securing the apex of said deceleration and extraction parachute to said cover, pyrotechnic ejector means mounted in said container and coupled to said cover for ejecting said cover from said container a predetermined time interval after the arming of said pyrotechnic ejector means to deploy said deceleration and extraction parachute from said container, first lanyard means coupled to said pyrotechnic ejector means for arming said pyrotechnic ejector means upon the launching of the target vehicle, pyrotechnic cutter means mounted in said container, a line secured to said riser means and to said pyrotechnic cutter means to be severed by said pyrotechnic cutter means a predetermined time interval after the arming thereof to release said deceleration and extraction parachute from said container, second lanyard means extending from said riser means to said release means to arm said release means upon the deployment of said deceleration and extraction parachute, a deployment bag for said main parachute positioned in said container and fastened to said riser means of said deceleration and extraction parachute for deploying said main parachute from said container upon the release of said deceleration and extraction parachute, a plurality of risers secured to said main parachute and to the forward end of said vehicle, a timer mechanism mounted in said container, third lanyard means coupled to said timer mechanism and to said riser means of said deceleration and extraction parachute for activating said timer mechanism upon the deployment of said deceleration and extraction parachute, and severing means mounted in said container in engagement with selected ones of said plurality of risers of said main parachute and activated by said timer mechanism to sever said selected ones of said plurality of risers so as to deactivate said main parachute a predetermined time interval after the deployment thereof.

References Cited in the file of this patent

UNITED STATES PATENTS

| | | |
|---|---|---|
| 2,752,594 | Link et al. | June 26, 1956 |
| 2,841,084 | Carlisle | July 1, 1958 |
| 3,001,739 | Faget et al. | Sept. 26, 1961 |